United States Patent
Kono et al.

(10) Patent No.: US 9,160,646 B2
(45) Date of Patent: Oct. 13, 2015

(54) DATA TRANSMISSION SYSTEM AND DATA TRANSMISSION DEVICE

(71) Applicant: HITACHI, LTD., Tokyo (JP)

(72) Inventors: Masashi Kono, Yokohama (JP); Hidehiro Toyoda, Yokohama (JP)

(73) Assignee: Hitachi, Ltd., Tokyo (JP)

(*) Notice: Subject to any disclaimer, the term of this patent is extended or adjusted under 35 U.S.C. 154(b) by 228 days.

(21) Appl. No.: 13/863,456

(22) Filed: Apr. 16, 2013

(65) Prior Publication Data

US 2013/0283108 A1 Oct. 24, 2013

(30) Foreign Application Priority Data

Apr. 18, 2012 (JP) ................... 2012-094468

(51) Int. Cl.
*H04L 12/26* (2006.01)
*H04L 1/00* (2006.01)

(52) U.S. Cl.
CPC ............. *H04L 43/50* (2013.01); *H04L 1/0066* (2013.01); *H04L 1/0075* (2013.01)

(58) Field of Classification Search
CPC ... H04L 43/50; H04L 1/0075; H04L 12/2697; H04L 1/24; H04L 12/26; H04L 1/0057; H04L 1/0041; H04L 1/00; H04J 3/14; G06F 11/221; H03M 13/11; H03M 13/27; G11B 20/1833
USPC ....................... 714/712; 398/1, 138
See application file for complete search history.

(56) References Cited

U.S. PATENT DOCUMENTS

| | | | |
|---|---|---|---|
| 8,498,204 B2* | 7/2013 | Toyoda et al. | 370/226 |
| 8,705,974 B2* | 4/2014 | Koganei et al. | 398/138 |
| 2006/0203847 A1* | 9/2006 | Toyoda | 370/468 |
| 2009/0247068 A1* | 10/2009 | Toyoda | 455/8 |
| 2012/0219282 A1* | 8/2012 | Koganei et al. | 398/1 |

FOREIGN PATENT DOCUMENTS

| | | |
|---|---|---|
| JP | 2006-067413 A | 3/2006 |
| JP | 2006-253852 A | 9/2006 |
| JP | 2009-239609 A | 10/2009 |
| JP | 2010-232787 A | 10/2010 |
| JP | 2011-147152 A | 7/2011 |
| JP | 2011-199361 A | 10/2011 |
| JP | 2011-211532 A | 10/2011 |
| JP | 2012-124973 A | 6/2012 |
| JP | 2012-134798 A | 7/2012 |
| JP | 2012-147479 A | 8/2012 |
| WO | 2005/010747 A2 | 2/2005 |

* cited by examiner

*Primary Examiner* — Phung M Chung
(74) *Attorney, Agent, or Firm* — Mattingly & Malur, PC

(57) ABSTRACT

A transmitter of a data transmission system using n transmission lanes generates an error code such as an error detection code or an error correction code from transmitted data on x transmission lanes input to an error detection/correction code generating unit, and transmits the same to a lane number switching controlling unit. The lane number switching controlling unit distributes the transmitted data and the error code to at least some of the n transmission lanes as data strings based on lane information indicating a normal lane, a failure lane, or a lane with a sign of a failure received from a receiver. Further, markers including the lane information indicating a normal or failure lane and information to detect a failure of the n transmission lanes are generated and inserted into data strings transmitted on the n transmission lanes, so that communications are performed with the receiver.

13 Claims, 14 Drawing Sheets

DATA TRANSMISSION SYSTEM AND DATA TRANSMISSION DEVICE

CLAIM OF PRIORITY

The present application claims priority from Japanese patent application JP2012-094468 filed on Apr. 18, 2012, the content of which is hereby incorporated by reference into this application.

BACKGROUND OF THE INVENTION

1. Field of the Invention

The present invention relates to a data transmission system in which plural transmission channels are provided and transmission capacity and the number of lanes of transmission channels can be dynamically changed, and particularly to a highly-reliable data transmission technique capable of solving a failure.

2. Description of the Related Art

Integration of servers, storages, and networks has been progressed in racks or between racks installed in a data center, and a high throughput of tens of Tbps (terabit per second) will be required in the future. In order to realize a high throughput, there is a method of changing from electric transmission to optical transmission. However, the failure rate of optical module is high, and the reliability of the whole system is significantly deteriorated.

Under these circumstances, Japanese Patent Application Laid-Open Publication No. 2011-211532 describes a data transmission technique that can realize improvement of failure resistance in multi-lane transmission in which the number of lanes can be changed.

Further, WO 2005/10747 describes a data transmission technique in which the parity of original data transmitted from a transmitter is calculated, an error check bit between the original data and parity data is calculated, and the both are transmitted together with the original data, so that a bit error occurring in transmission channels can be corrected on the receiver side and the reliability of the transmission channels can be improved.

However, a system with the failure resistance improved can be established by the technique described in Japanese Patent Application Laid-Open Publication No. 2011-211532. However, it takes time before restoring a failure device, and thus a data loss disadvantageously occurs in the period. Further, it is difficult to detect a failure of a device in advance because the frequency and state of a failure are different depending on devices.

In addition, in the case where errors occur in even-numbered transmission channels, the errors cannot be detected and corrected by the technique described in WO 2005/10747. Further, in the case where the number of errors of transmission channels is significantly increased, the errors cannot be corrected. Furthermore, in the case where transmission channels are disconnected, it is impossible to deal with the problem.

In order to address the above-described problems, an object of the present invention is to provide a data transmission system and device in which plural transmission routes are provided and transmission capacity and the number of lanes of transmission channels can be dynamically changed, and further a highly-reliable data transmission system and device capable of immediately solving a failure.

SUMMARY OF THE INVENTION

In order to achieve the above-described object, an aspect of the present invention provides a data transmission system in which communications are performed between a transmitter and a receiver using n transmission lanes, wherein the transmitter includes: an error code generating unit connected to x (x<n) transmission lanes; and a lane switching controlling unit that generates an error code using transmitted data input to the error code generating unit through the x (x<n) transmission lanes to distribute the transmitted data and the error code to some or all of the n transmission lanes, the lane switching controlling unit: determines the some or all of the transmission lanes through which the transmitted data and the error code are distributed based on failure or normal lane information received from the receiver; generates information to detect a failure of the n of transmission lanes; generates a marker including the information to detect a failure and the lane information; and inserts the marker into each of data strings transmitted on the n transmission lanes to be transmitted to the receiver, and the receiver includes: a detecting unit that detects the marker from the data strings transmitted on the n transmission lanes; an error correcting unit that corrects an error using the error code of the data strings transmitted on the n transmission lanes; and a failure information analyzing unit that determines a transmission lane to be used among the n transmission lanes based on the lane information in the marker, and detects a failure or normal lane of the n transmission lanes based on the information to detect a failure in the marker.

Further, in order to achieve the above-described object, another aspect of the present invention provides a data transmission device having n transmission lanes, the device including: an error code generating unit connected to x (x<n) transmission lanes; and a lane switching controlling unit that generates an error code using transmitted data input to the error code generating unit through the x (x<n) transmission lanes to distribute the transmitted data and the error code to some or all of the n transmission lanes, wherein the lane switching controlling unit: determines the some or all of the transmission lanes through which the transmitted data and the error code are distributed based on failure or normal lane information received from the receiver; generates information to detect a failure of the n transmission lanes; generates a marker including the information to detect a failure and the lane information; and inserts the marker into each of data strings transmitted on the n transmission lanes to be transmitted, so that communications with the receiver are performed.

Furthermore, in order to achieve the above-described object, still another aspect of the present invention provides a data transmission device having n transmission lanes, the device including: a detecting unit that detects a marker including information to detect a failure of the n transmission lanes from data strings including transmitted data and an error code transmitted on the n transmission lanes and failure or normal lane information; an error correcting unit that corrects an error using the error code of the data strings transmitted on the n transmission lanes; and a failure information analyzing unit that determines a transmission lane to be used among the n transmission lanes based on the lane information in the marker, and detects a failure or normal lane of the n transmission lanes based on the information to detect a failure in the marker to be used as the lane information.

According to the aspects of the present invention, the failure rate of a system can be reduced, and a highly-reliable system can be established. Further, in a system in which communication speeds are fast and modules and boards are difficult to be replaced, a lane can be switched before a failure of the modules or a failure of transmission channels occurs.

DETAILED DESCRIPTION OF THE INVENTION

Figure 1:
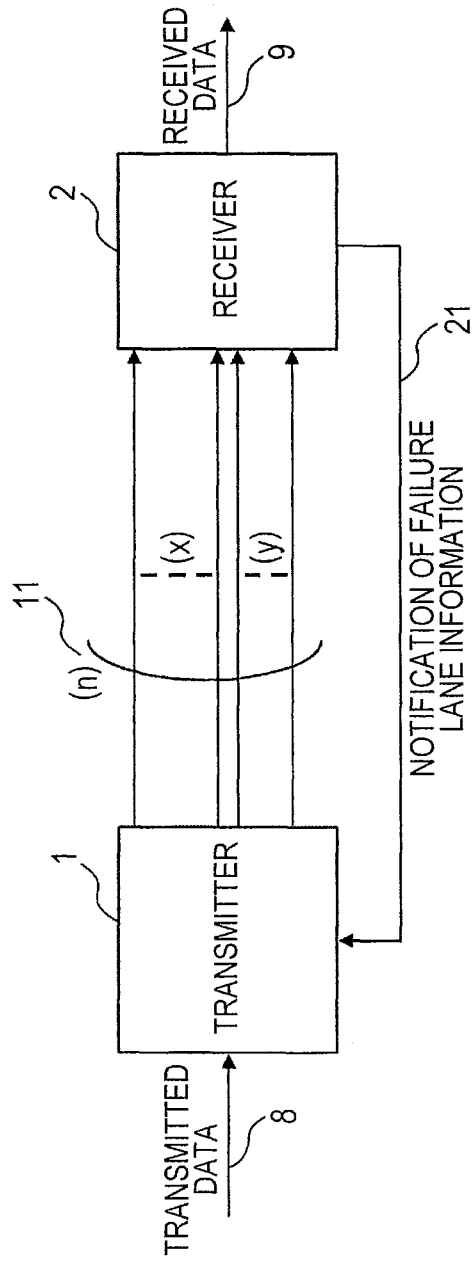
FIG. 1 is a block diagram for showing an example of a configuration of a data transmission system according to a first embodiment.

Hereinafter, various embodiments of the present invention will be described in detail based on the drawings. The above-described object and novel characteristics of the present invention will become apparent from the description of the embodiments explained below. It should be noted that the same members and functional modules are given the same reference numerals in principle in the all drawings for explaining the embodiments, and the explanations thereof will not be repeated. In the specification, an error detection code, an error correction code, or the both are collectively referred to as an "error code" in some cases. In addition, an error detection/correction code generating unit is referred to as an "error code generating unit" in some cases. Further, in the specification, "lane information" means normal lane information or failure lane information. The normal lane information means information of a normal lane, and the failure lane information means information of a failure lane and information of a lane for which a sign of a failure has been detected, in other words, a failure has been detected in advance.

First Embodiment

FIG. 1 is a block diagram for showing a configuration example of a data transmission system according to a first embodiment. The data transmission system shown in FIG. 1 includes a transmitter 1 and a receiver 2 each functioning as a data transmission device. A transmitted data frame (hereinafter, referred to as transmitted data) 8 to be transmitted to the receiver 2 is input to the transmitter 1. The transmitter 1 outputs the input transmitted data while using some or all of n physical lanes which forms a transmission channel 11. Further, failure lane information or in-use lane information (hereinafter, collectively referred to as lane information), and an error detection code, an error correction code, or the both codes (hereinafter, collectively referred to as an error code) output from the receiver 2 are input to the transmitter 1 through a dedicated line 21. It should be noted that n is an integer equal to 2 or larger.

The transmitter 1 is connected to the receiver 2 through the transmission channel 11 configured using the n physical lanes, and data output from the transmitter 1 is input to the receiver 2 through the transmission channel 11. The receiver 2 outputs the input data as a received data frame (hereinafter, referred to as received data) 9. Further, the receiver 2 notifies the transmitter 1 of the lane information and the error code through the dedicated line 21. Specifically, in the data transmission system of the embodiment, the lane information and the error code are negotiated between the transmitter 1 and the receiver 2 through the transmission channel 11 and the dedicated line 21.

Specifically, a notification of the lane information and the error code is made in one direction from the transmitter 1 to the receiver 2 through the transmission channel 11. In addition to this, a notification is made from the receiver 2 to the transmitter 1 through the dedicated line 21. It should be noted that n indicates the number of lanes of the whole transmission channel 11, and is an integer equal to 2 or larger. Further, the transmission channel 11 of the embodiment is configured using x transmission lanes 12 and y redundant lanes 13 to transmit data, and n=x+y is satisfied.

Figure 2:
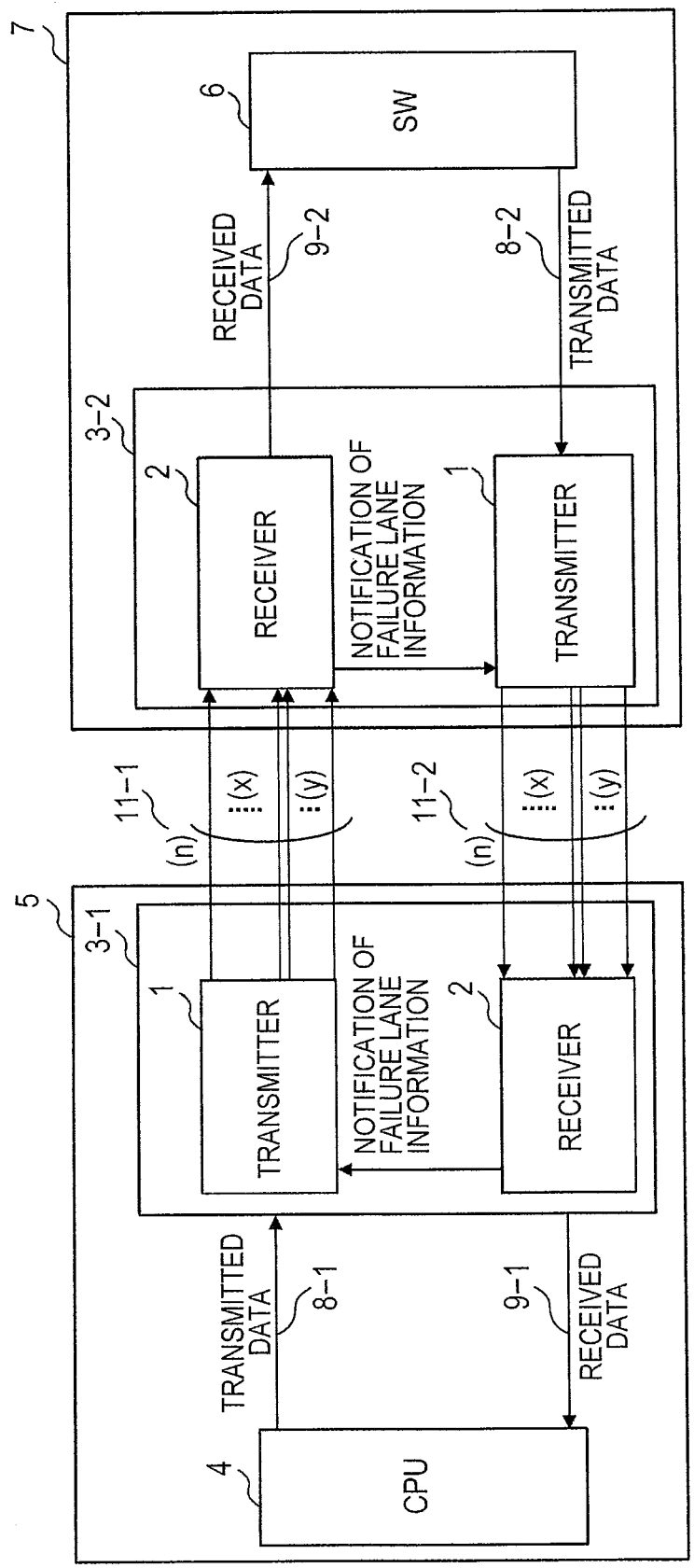
FIG. 2 is a block diagram for showing another example of a configuration of the data transmission system according to the first embodiment.

FIG. 2 is a block diagram for showing an example of a data transmission system having a configuration different from that of FIG. 1 in the data transmission system according to the first embodiment. The data transmission system shown in FIG. 2 includes transceivers 3 (3-1 and 3-2) as data transmission devices each having a transmitter 1 and a receiver 2, a CPU board 5 having the transceiver 3-1 and a CPU (Central Processing Unit) 4, and a SW board 7 having the transceiver 3-2 and a SW (switch) 6. However, plural constitutional modules may be provided in the embodiment.

Transmitted data 8-1 is input to the transceiver 3-1 from the CPU 4, and received data 9-1 is input to the CPU 4 from the transceiver 3-1. Transmitted data 8-2 is input to the transceiver 3-2 from the SW 6, and received data 9-2 is input to the SW 6 from the transceiver 3-2. Further, the configurations of the CPU board 5 and the SW board 7 can be changed without departing from the scope of the present invention. For example, the CPU board 5 and another CPU board 5 may be connected to each other, or the SW board 7 and another SW board 7 may be connected to each other.

In the configuration of the data transmission system shown in FIG. 2, two transmission channels 11-1 and 11-2 in different directions are formed between the transceiver 3-1 and the transceiver 3-2. The configuration of FIG. 2 is different from that of FIG. 1 in that the receiver 2 outputs the lane information and the error code to the transmitter 1 using the transmission channels 11-1 and 11-2 in directions opposite to each other.

Specifically, in the case where, for example, the receiver 2 in the transceiver 3-2 negotiates the lane information and the like with the transmitter 1 in the transceiver 3-1 in the configuration example of FIG. 2, the information is transmitted through a route of the receiver 2 in the transceiver 3-2 the transmitter 1 in the transceiver 3-2 the receiver 2 in the transceiver 3-1 the transmitter 1 in the transceiver 3-1. This also applies to a case in which the receiver 2 in the transceiver 3-1 negotiates the lane information and the like with the transmitter 1 in the transceiver 3-2. It should be noted that other configurations are the same as those in FIG. 1, and thus explanations thereof will not be repeated.

The data transmission system of the embodiment described above using FIG. 1 or FIG. 2 has a configuration in which a notification of information of a failure lane or information of a lane for which a sign of a failure has been detected in advance can be made in transmission and reception. Accordingly, a notification of information of a failure lane or information of a lane for which a sign of a failure has been detected in advance needs to be made between the transmitter 1 and the receiver 2 for mutual recognition. However, the notification of information may be made in one direction or two directions in the data transmission system of the embodiment.

Further, in the data transmission system of the embodiment, the number of transmission lanes of the transmission channel 11 to be used can be changed, the details of which will be described later. Accordingly, the position of the transmission lane to be used needs to be mutually recognized between the transmitter 1 and the receiver 2. A notification of information for mutual recognition may be made in one direction or two directions in the data transmission system of the embodiment.

For example, the following is an example of a one-way notification of information. First, as exemplified in FIG. 1, the transmitter 1 determines which of the n transmission lanes is used, and notifies the receiver 2 of the determined information through the transmission channel 11. Next, the receiver 2 recognizes the determined information, and appropriately changes the settings of the internal circuit of the receiver 2 in accordance with the information. Then, communications based on the determined information are mutually recognized as valid communications between the transmitter 1 and the receiver 2.

On the other hand, the following is a first example of a two-way notification of information. As the first example, the transmitter 1 first determines which of the n transmission lanes is used, and notifies the receiver 2 of the determined information through the transmission channel 11. In the case where the receiver 2 accepts the determined information, the receiver 2 appropriately changes the settings of the internal circuit of the receiver 2 in accordance with the information. Then, the receiver 2 notifies the transmitter 1 of the completion of the change. In response to the notification, the transmitter 1 appropriately changes the settings of the internal circuit of the transmitter 1, and then communications based on the determined information are mutually recognized as valid communications.

Further, as a second example of a two-way notification of information, on the assumption that the receiver 2 has a function of detecting a failure occurring in each of the n transmission lanes of the transmission channel 11, the receiver 2 first notifies the transmitter 1 of a transmission lane in which a failure has occurred. While avoiding the transmission lane in which a failure has occurred, the transmitter 1 determines which of the n transmission lanes is used, and notifies the receiver 2 of the determined information through the transmission channel 11. The receiver 2 recognizes the determined information, and appropriately changes the settings of the internal circuit of the receiver 2 in accordance with the information. Then, communications based on the determined information are mutually recognized as valid communications between the transmitter 1 and the receiver 2.

In accordance with a difference between the above-described various methods, order relations and the like when various functional blocks, to be described later, in the transmitter 1 and the receiver 2 actually perform operations appropriately differ. However, detailed explanations will be made below using the second example of a two-way notification. It should be noted that the present invention can be applied to cases other than the case of a one-way or two-way notification by appropriately adjusting the order relations and the like.

Figure 3:
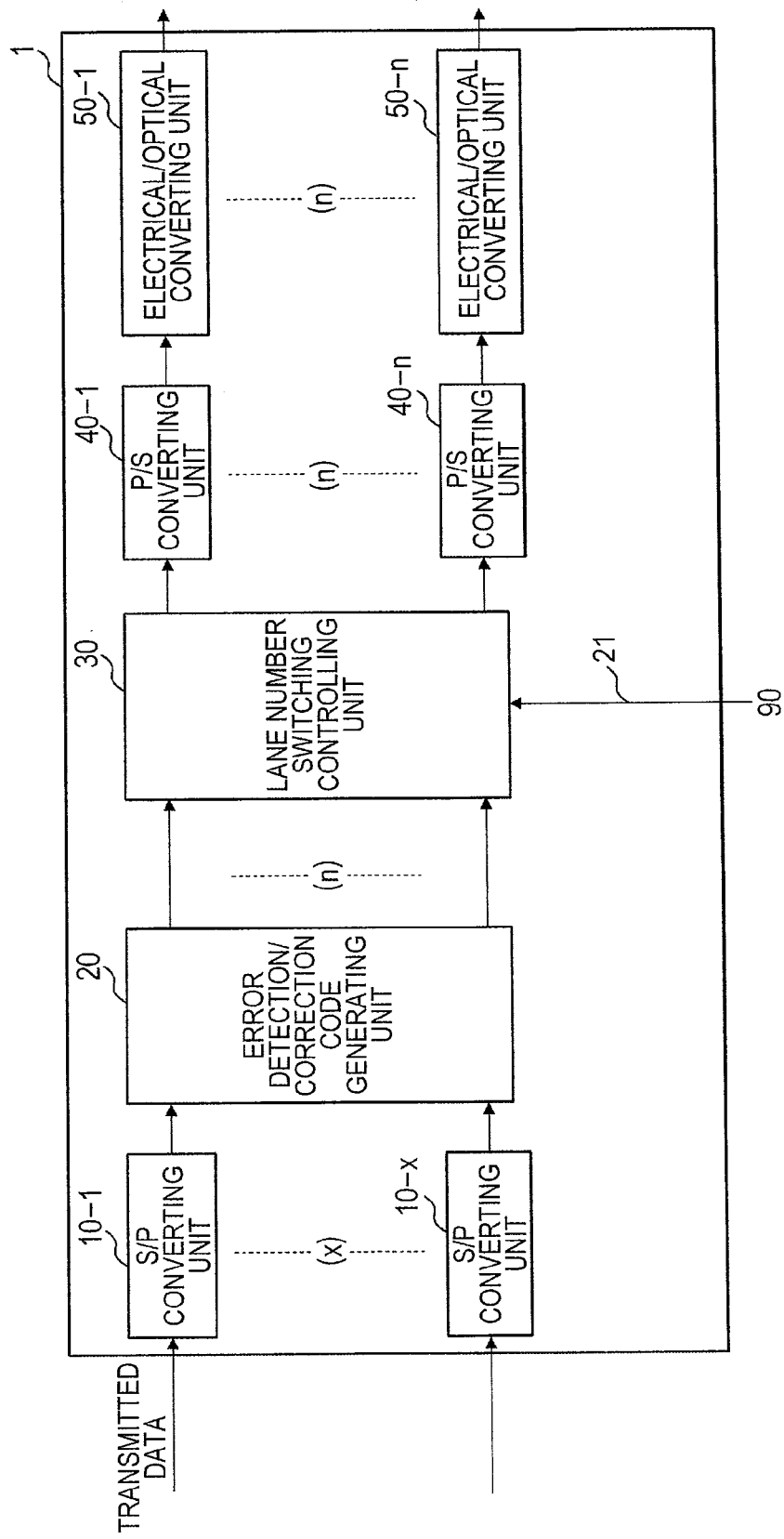
FIG. 3 is a block diagram for showing an example of a detailed configuration of a transmitter included in the data transmission system according to the first embodiment.

FIG. 3 is a block diagram for showing an example of an internal configuration of the transmitter included in the data transmission system according to the first embodiment. The transmitter corresponds to the transmitter 1 of FIG. 1 or FIG. 2. As shown in FIG. 3, the transmitter 1 includes serial/parallel converting units 10 (10-1 to 10-$x$), an error detection/correction code generating unit 20, a lane number switching controlling unit 30, parallel/serial converting units 40 (40-1 to 40-$n$), and electrical/optical converting units 50 (50-1 to 50-$n$). It should be noted that as described in FIG. 1, x is an integer smaller than n, such as x=10 and n=12. As shown in FIG. 3, the lane number switching controlling unit 30 is notified of data strings of failure lane information from the receiver 2 through the dedicated line 21.

First, a data flow of the transmitter 1 will be described. The transmitted data transmitted on the x transmission lanes is input to each of the serial/parallel converting units 10 (10-1 to 10-$x$), and is converted into parallel data. The serial/parallel converting units 10 (10-1 to 10-$x$) output data strings to the error detection/correction code generating unit 20. The error detection/correction code generating unit 20 outputs n data strings to the parallel/serial converting units 40 (40-1 to 40-$n$) through the lane number switching controlling unit 30. The parallel/serial converting units 40 (40-1 to 40-$n$) output converted serial data strings to the electrical/optical converting units 50 (50-1 to 50-$n$). Next, a detailed operational example of each unit in the transmitter 1 of the embodiment will be described. The transmitted data is input to each of the serial/parallel converting units 10 (10-1 to 10-$x$). In this case, the serial/parallel converting units 10 (10-1 to 10-$x$) convert the serial bit strings of the input data to parallel bit strings to be transmitted to the error detection/correction code generating unit 20.

The error detection/correction code generating unit 20 generates an error code for the bit strings of the data received from the serial/parallel converting units 10 (10-1 to 10-$x$), distributes the bit strings of the data received from the serial/parallel converting units 10 (10-1 to 10-$x$) to the x transmission lanes, and distributes the error code to the y (=n−x) redundant lanes to be transmitted to the lane number switching controlling unit 30. It should be noted that the types of error detection code and error correction code are not particularly limited.

The lane number switching controlling unit 30 receives the bit strings of the data and the bit strings of the data of the error code generated by the error detection/correction code generating unit 20 from the error detection/correction code generating unit 20, and distributes the bit strings of the data to lanes other than failure lanes based on the failure lane information, to be described later, received from the receiver 2 through a dedicated line. Further, the lane number switching controlling unit 30 generates the lane information and the error code as a marker, to be described later, based on the failure lane information, and inserts the same into a transmission channel.

The parallel/serial converting units 40 (40-1 to 40-n) convert the parallel bit strings of the data input from the lane number switching controlling unit 30 to serial bit strings to be output to the electrical/optical converting units 50 (50-1 to 50-n).

The electrical/optical converting units 50 (50-1 to 50-n) convert the bit strings of the data input from the parallel/serial converting units 40 (40-1 to 40-n) from electric signals to optical signals to be output to a transmission channel.

As described above, the transmitter 1 according to the embodiment allows the error detection/correction code generating unit 20 to generate the error code for the input transmitted data, and allows the lane number switching controlling unit 30 to distribute the transmitted data input to the transmitter 1 to lanes other than failure lanes based on the failure lane information notified from the receiver 2. Further, a PRBS (Pseudo Random Bit Sequence) generated by a PRBS generating unit 304, to be describe later, is output to the failure lanes.

Figure 4:
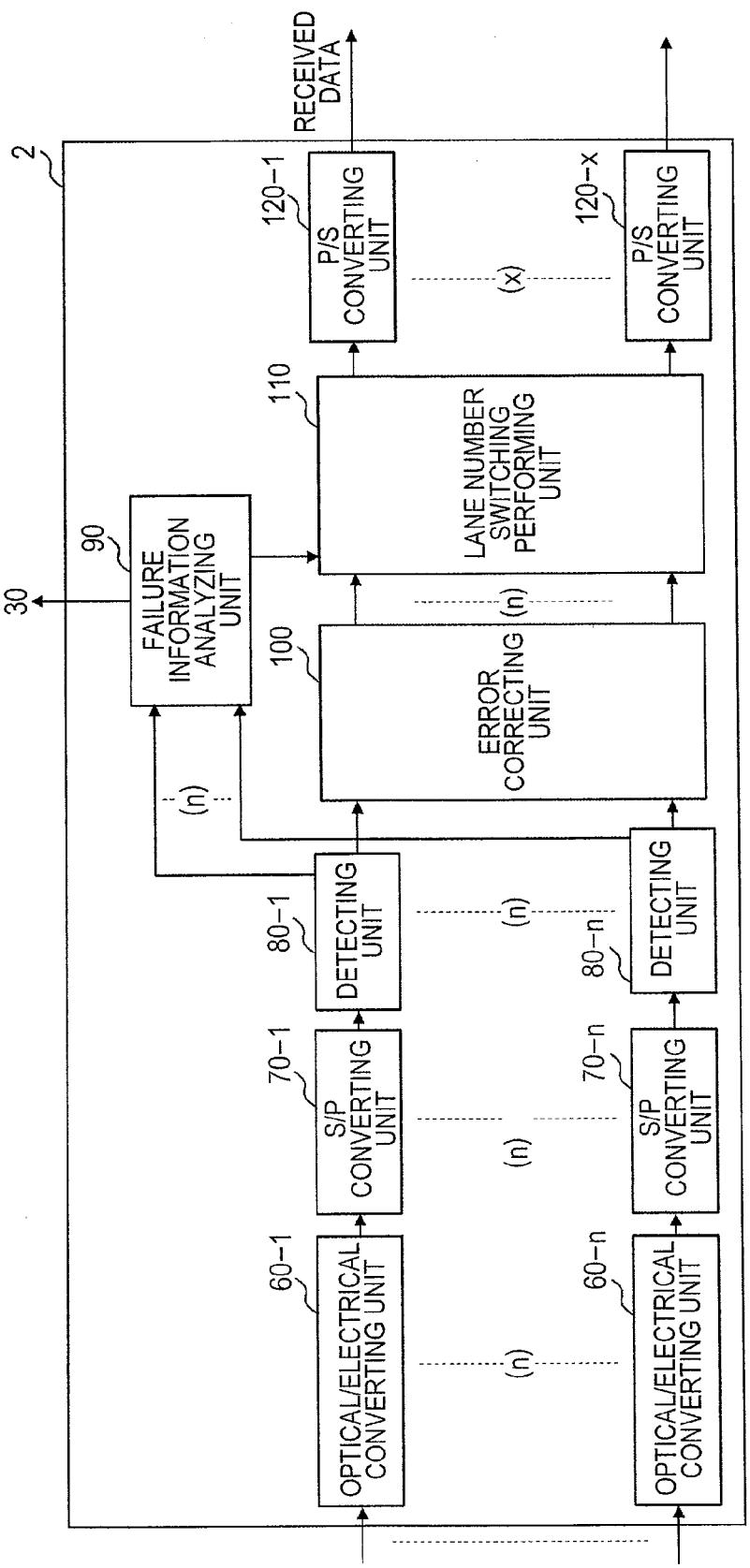
FIG. 4 is a block diagram for showing an example of a detailed configuration of a receiver included in the data transmission system according to the first embodiment.

FIG. 4 is a block diagram for showing an example of an internal configuration of the receiver 2 included in the data transmission system according to the first embodiment. The receiver 2 corresponds to the receiver 2 of FIG. 1 or FIG. 2. Data strings are input to the receiver 2 shown in FIG. 4 from the transmission channel 11 configured using n transmission lanes, and the receiver 2 outputs received frame data (hereinafter, referred to as received data) and predetermined data strings. The receiver 2 includes optical/electrical converting units 60 (60-1 to 60-n), serial/parallel converting units 70 (70-1 to 70-n), detecting units 80 (80-1 to 80-n), a failure information analyzing unit 90, an error correcting unit 100, a lane number switching performing unit 110, and parallel/serial converting units 120 (120-1 to 120-n). It should be noted that the number x of transmission lanes is an integer smaller than n such as x=10 and n=12.

First, a data flow of the receiver 2 will be described. Bit strings of data from the transmitter 1 are input to the optical/electrical converting units 60 (60-1 to 60-n) through the transmission channel having the n transmission lanes. The optical/electrical converting units 60 (60-1 to 60-n) output the bit strings to the serial/parallel converting units 70 (70-1 to 70-n). The serial/parallel converting units 70 (70-1 to 70-n) output the bit strings of converted parallel data to the detecting units 80 (80-1 to 80-n).

The detecting units 80 (80-1 to 80-n) output the bit strings to the failure information analyzing unit 90 and the error correcting unit 100. The failure information analyzing unit 90 outputs the bit strings to the transmitter 1. The error correcting unit 100 outputs the bit strings to the lane number switching performing unit 110. The lane number switching performing unit 110 outputs the bit strings to the parallel/serial converting units 120 (120-1 to 120-n). The parallel/serial converting units 120 (120-1 to 120-n) finally output the received data as serial data.

Next, detailed operations of the receiver 2 according to the embodiment will be described. The optical/electrical converting units 60 (60-1 to 60-n) convert the bit strings of the data input through, for example, the transmission channel 11 of FIG. 1 configured using the n transmission lanes from optical signals to electric signals, and output the bit strings to the serial/parallel converting units 70 (70-1 to 70-n). The serial/parallel converting units 70 (70-1 to 70-n) convert the serial bit strings of the data received from the optical/electrical converting units 60 (60-1 to 60-n) to parallel bit strings, and output the bit strings to the detecting units 80 (80-1 to 80-n).

The detecting units 80 (80-1 to 80-n) detect markers, to be described later, included in the bit strings received from the serial/parallel converting units 70 (70-1 to 70-n), and output the lane information and the error codes included in the markers to the failure information analyzing unit 90 as marker information. In addition, the detecting units 80 (80-1 to 80-n) output the bit strings of data with the markers deleted to the error correcting unit 100.

The failure information analyzing unit 90 determines a lane position to be used based on the marker information received from the detecting units 80 while using the failure lane information notified from the transmitter 1, and outputs the bit strings of the data to the lane number switching performing unit 110. Further, the failure information analyzing unit 90 determines a failure of a lane using a method, to be described later, for detecting an error of each transmission lane based on the marker information received from the detecting units 80, and outputs the bit strings of the data to the transmitter 1 and the lane number switching performing unit 110.

The error correcting unit 100 detects and corrects an error using an error correction code contained in the bit strings received from the detecting units 80 (80-1 to 80-n), and outputs the bit strings of the data to the lane number switching performing unit 110.

The lane number switching performing unit 110 rebuilds the bit strings of the data of n lanes received from the error correcting unit 100 into those of x transmission lanes based on the lane information received from the failure information analyzing unit 90, and outputs the bit strings of the data to the parallel/serial converting units 120 (120-1 to 120-n). It should be noted that the number x is an integer smaller than n such as x=10 and n=12.

The parallel/serial converting units 120 (120-1 to 120-n) convert the parallel bit strings of the data received from the lane number switching performing unit 110 to serial bit strings, and finally output the received data.

Figure 5:
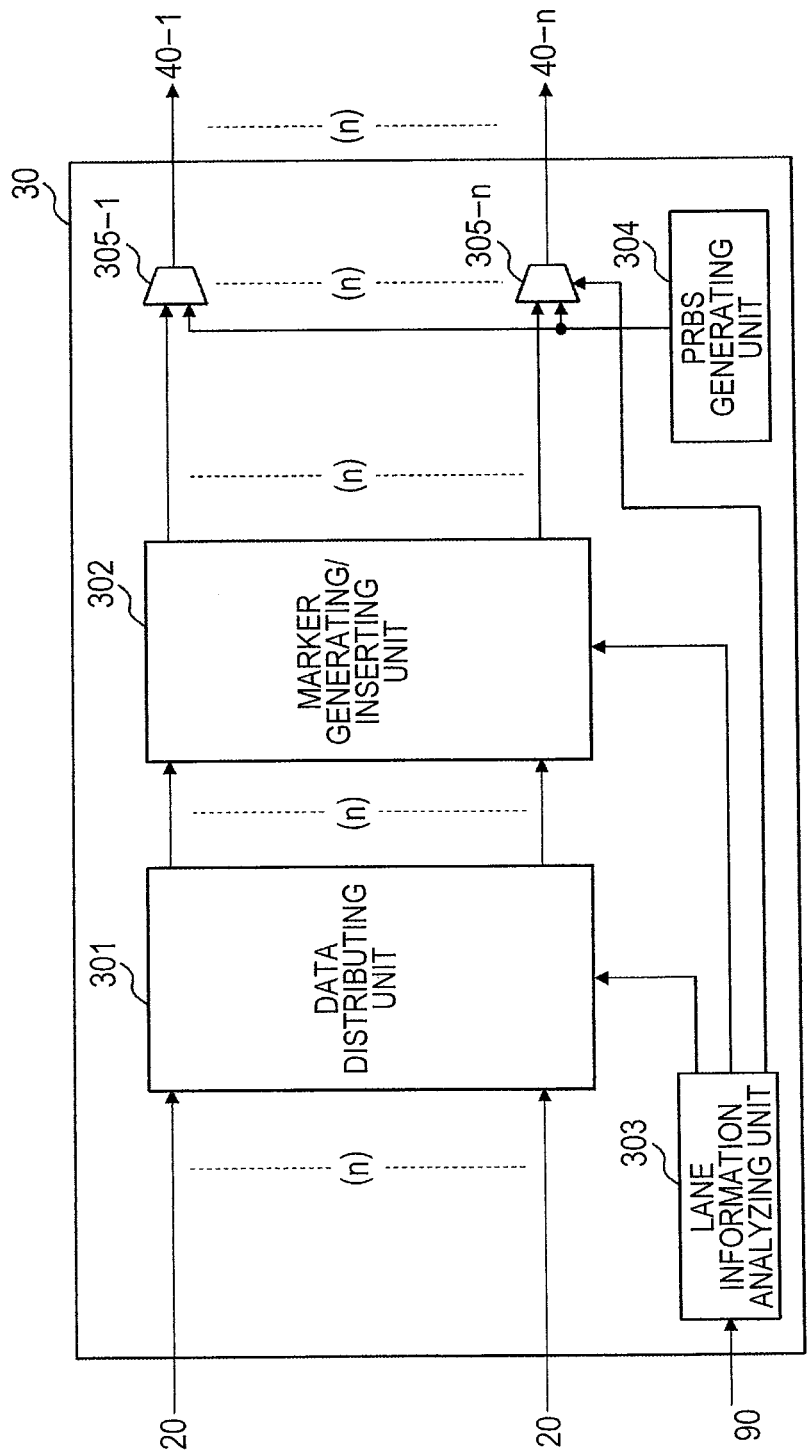
FIG. 5 is a block diagram for showing an example of a configuration of a lane number switching controlling unit included in the data transmission system according to the first embodiment.

FIG. 5 is a block diagram for showing an internal configuration of the lane number switching controlling unit 30 included in the transmitter 1 of the data transmission system according to the first embodiment. The lane number switching controlling unit 30 corresponds to the lane number switching controlling unit 30 of FIG. 3. Data strings transmitted from a transmission channel configured using n transmission lanes and the receiver 2 are input to the lane number switching controlling unit 30 shown in FIG. 5, and the lane number switching controlling unit 30 outputs the bit strings of the data to a transmission channel configured using n transmission lanes. The lane number switching controlling unit 30 includes a data distributing unit 301, a marker generating/inserting unit 302, a lane information analyzing unit 303, a PRBS generating unit 304, and selectors 305 (305-1 to 305-n).

First, a data flow inside the lane number switching controlling unit 30 will be described. The bit strings of the data from the error detection/correction code generating unit 20 are input to the data distributing unit 301 through a transmission channel. The bit strings of the data output from the lane information analyzing unit 303 to which the failure lane information from the receiver 2 is input are input to the data distributing unit 301, the marker generating/inserting unit 302, and the selectors 305 (305-1 to 305-n). The data distributing unit 301 outputs the bit strings of the data to the marker generating/inserting unit 302. The marker generating/inserting unit 302 outputs the bit strings of the data to the selectors 305 (305-1 to 305-n). The selectors 305 (305-1 to 305-n) finally output the bit strings of the data to the parallel/serial converting units 40 (40-1 to 40-n).

Next, detailed operations of the lane number switching controlling unit 30 will be described. The lane information analyzing unit 303 outputs lane information to be used to the data distributing unit 301 based on the failure lane information that is notified from the receiver 2 and is failure information of the detected lane. Further, the lane information analyzing unit 303 outputs information of failure lanes and normal lanes to the marker generating/inserting unit 302 based on the failure lane information. Further, the lane information analyzing unit 303 outputs the information of failure lanes to the selectors 305 (305-1 to 305-n) based on the failure lane information.

The data distributing unit 301 distributes the bit strings of the data input through the transmission channel configured using the n transmission lanes only to normal lanes based on the failure lane information notified from the lane information analyzing unit 303, and outputs the same to the marker generating/inserting unit 302. For example, in the case where the all lanes are normal, an error detection/correction code generated by the error detection/correction code generating unit is inserted into each of x lanes, and normal data is inserted into each of the remaining y (=n−x) lanes. Further, in the case where, for example, z lanes are failure, the error detection/correction code generated by the error detection/correction code generating unit is inserted into each of (x-z) lanes, normal data is inserted into each of the remaining y lanes, and an idle pattern is inserted into each of z failure lanes.

The marker generating/inserting unit 302 generates markers, to be described later, based on the failure and normal lane information notified from the lane information analyzing unit 303, inserts the markers into the bit strings of the data in the all lanes, and outputs the bit strings of the data to the selectors 305 (305-1 to 305-n).

The PRBS generating unit 304 of FIG. 5 generates patterns of PRBSs (Pseudo Random Bit Sequences), and outputs the same to the selectors 305 (305-1 to 305-n) to be used as idle patterns. It should be noted that the types of PRBSs generated are not particularly limited.

The selectors 305 (305-1 to 305-n) insert the PRBS patterns received from the PRBS generating unit 304 to failure lanes based on the information of failure lanes notified from the lane information analyzing unit 303, insert the normal data and the bit strings of the data of the error detection/correction code received from the data distributing unit 301 into normal lanes, and finally output the bit strings of the data to the parallel/serial converting units 40 (40-1 to 40-n).

As described above, the transmitter 1 according to the embodiment can appropriately change the lanes to which data is output based on the failure and normal lane information notified from the failure information analyzing unit 90 of the receiver 2, and inserts the failure lane information and the normal lane information into the markers to be output to the transmission channel 11.

Figure 6:
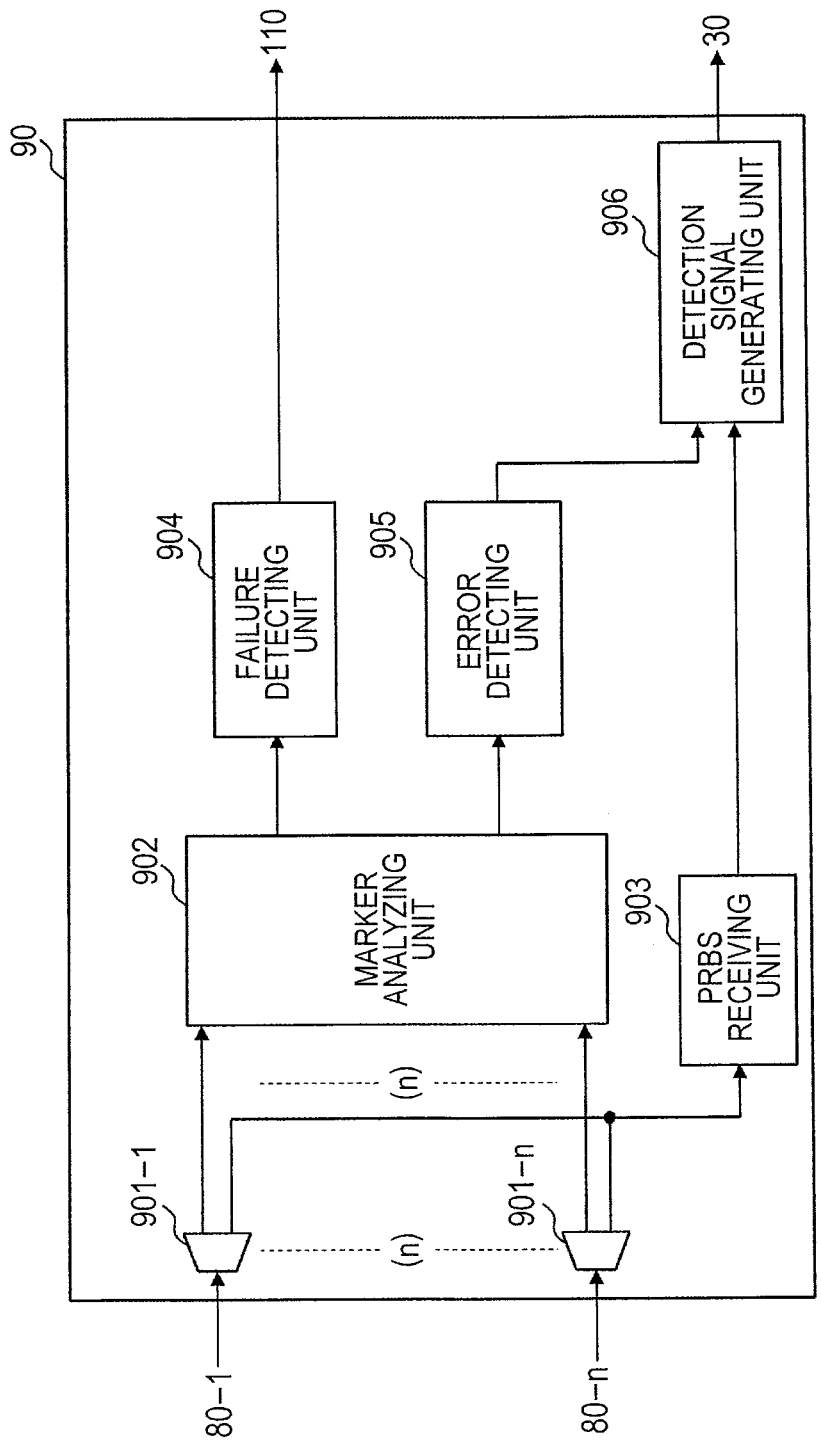
FIG. 6 is a block diagram for showing an example of a configuration of a failure information analyzing unit included in the data transmission system according to the first embodiment.

FIG. 6 is a block diagram for showing a concrete example of an internal configuration of the failure information analyzing unit included in the receiver 2 of the data transmission system according to the first embodiment. The failure information analyzing unit corresponds to the failure information analyzing unit 90 in the receiver 2 of FIG. 4. Bit strings of data are input to the failure information analyzing unit 90 shown in FIG. 6 from a transmission channel configured using n transmission lanes, and are output to the lane number switching performing unit 110 included in the receiver 2 and the lane number switching controlling unit 30 included in the transmitter 1. As shown in FIG. 6, the failure information analyzing unit 90 includes selectors 901 (901-1 to 901-n), a marker analyzing unit 902, a PRBS receiving unit 903, a failure detecting unit 904, an error detecting unit 905, and a detection signal generating unit 906.

First, a data flow inside the failure information analyzing unit 90 will be described. The bit strings of the data from the detecting units 80 (80-1 to 80-n) in the receiver 2 of FIG. 4 are input to the selectors 901 (901-1 to 901-n) through n transmission channels. The selectors 901 (901-1 to 901-n) output the bit strings of the data to the marker analyzing unit 902 and the PRBS receiving unit 903. The marker analyzing unit 902 analyzes the markers in the bit strings, and outputs the bit strings of the data to the failure detecting unit 904 and the error detecting unit 905.

The PRBS receiving unit 903 outputs the bit strings of the data to the detection signal generating unit 906. The failure detecting unit 904 outputs the bit strings of the data to the lane number switching performing unit 110 included in the receiver 2. The error detecting unit 905 is outputs the bit strings of the data to the detection signal generating unit 906. A concrete example of an internal configuration of the error detecting unit 905 will be described later using FIG. 10. The detection signal generating unit 906 outputs the bit strings of the data to the lane number switching controlling unit 30 of the transmitter 1.

Next, detailed operations of the failure information analyzing unit 90 of FIG. 6 will be described. The selectors 901 (901-1 to 901-n) separate the bit strings of the data input through the transmission channel configured using the n transmission lanes into the PRBS patterns and normal data, and output the bit strings of the PRBS patterns and the normal data to the PRBS receiving unit 903 and the marker analyzing unit 902, respectively.

The marker analyzing unit 902 analyzes a marker configuration to be described later, outputs the lane information output from the transmitter 1 to the failure detecting unit 904, and outputs the error code output from the transmitter 1 to the error detecting unit 905. Specifically, the marker analyzing unit 902 extracts the lane information and the error code information from the markers embedded by the marker generating/inserting unit 302 of the transmitter 1, deletes the markers received from the selectors 901 (901-1 to 901-n), and outputs the bit strings of the data to the failure detecting unit 904 and the error detecting unit 905.

The failure detecting unit 904 determines lanes to be used based on the lane information received from the marker analyzing unit 902, and outputs the same to the lane number switching performing unit 110 of the receiver 2.

The error detecting unit 905 obtains an error of the bit strings of the data of each lane using the error code received from the marker analyzing unit 902, detects a failure or a sign of a failure using a detection method to be described later, and outputs the bit strings of the data to the detection signal generating unit 906.

The PRBS receiving unit 903 detects an error of the PRBS patterns of each lane generated by the transmitter 1, and outputs the calculation results of the number of times and the frequency of errors of each lane to the detection signal generating unit 906.

The detection signal generating unit 906 determines the state of each lane using the bit strings of the data received from the error detecting unit 905 and the PRBS receiving unit 903. If it is determined as failure, the lane number switching controlling unit 30 is notified of the failure lane information. If it is determined as normal, the lane number switching controlling unit 30 is notified of the normal lane information.

As described above, the receiver 2 of the embodiment monitors the state of each lane. If a sign or warning of a failure is detected, or if it is determined as a failure lane, the receiver 2 notifies the transmitter 1 of the failure lane information. If it is determined as a normal lane, the receiver 2 notifies the transmitter 1 of the normal lane information. However, a notification of either of the failure lane information or the normal lane information may be made in some cases.

Figure 7:
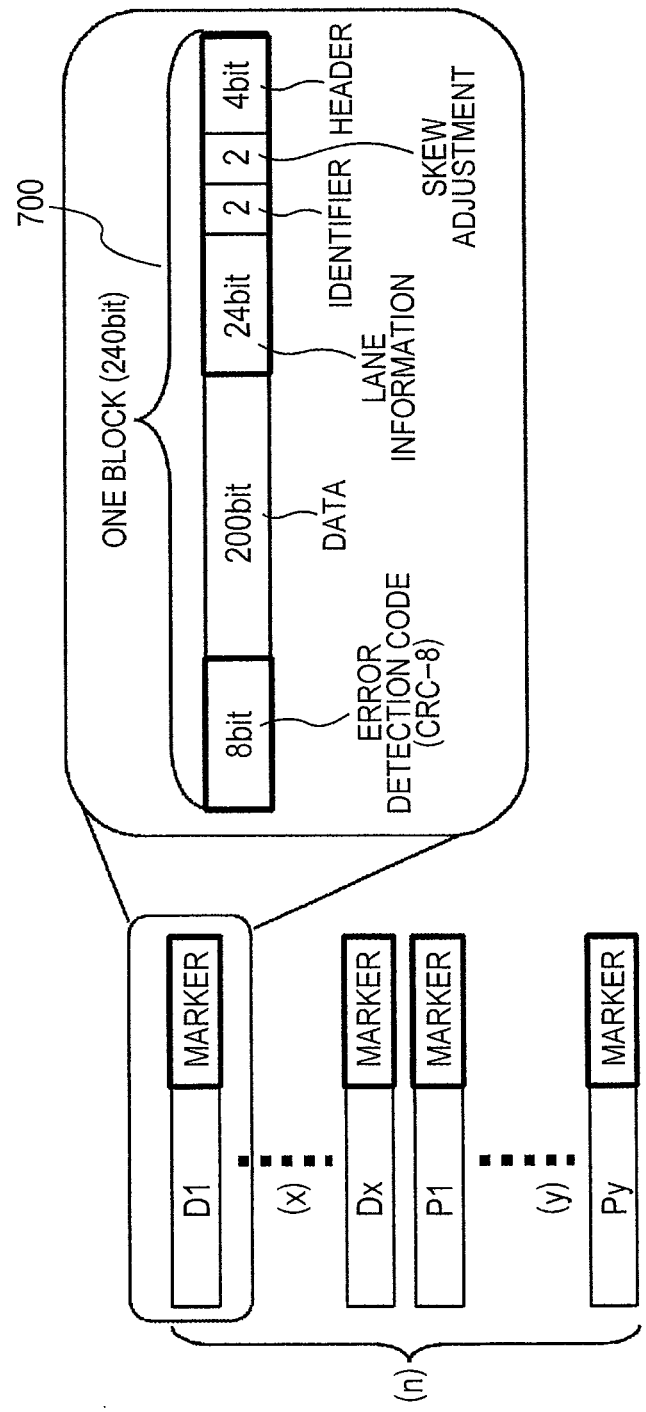
FIG. 7 is a diagram for showing an example of a configuration of markers generated by a marker generating/inserting unit included in the data transmission system according to the first embodiment.

FIG. 7 is a diagram for showing a concrete example of a configuration of the markers that are generated by the marker generating/inserting unit 302 in the lane number switching controlling unit 30 of FIG. 5 in the data transmission system of the embodiment and are inserted into the data strings composed of transmitted data and error codes in predetermined cycles.

X (=n−y) data bit strings D (D1 to Dx) received from the error detection/correction code generating unit 20 and y bit strings P (P1 to Py) of error detection/correction codes generated by the data distributing unit 301 are input to the maker generating/inserting unit 302 from the data distributing unit 301 through a transmission channel configured using n transmission lanes.

As shown in FIG. 7, markers 700 are inserted into the X (=n−y) data bit strings D (D1 to Dx) and the y bit strings P (P1 to Py) of error detection/correction codes input to the marker generating/inserting unit 302 in the all transmission lanes in predetermined cycles.

As being apparent from FIG. 7, each marker generated by the marker generating/inserting unit 302 has one block of 240 bits including a data bit string D or P of 200 bits received from the error detection/correction code generating unit 20, 24-bit lane information indicating information of a normal lane or a failure lane, an 8-bit error detection code (CRC-8) for detecting an error of each lane, a 2-bit identifier indicating the number of failure lanes, a 2-bit skew adjustment adjusting the skew of the marker, and a 4-bit header that recognizes the marker to distinguish the failure lane information from the normal lane information.

It should be noted that the marker configuration is not limited to the above-described one in the system of the embodiment, and the number of bits of one block and the number of bits of the marker can be changed without departing from the scope of the present invention. For example, the error detection code (CRC-8) that is an error code may be changed to the error correction code. Further, the cycles in which the markers are inserted into transmitted data strings can be changed, as will be described later.

An operational example of the error detecting unit 905 in the failure information analyzing unit 90 shown in FIG. 6 in the receiver 2 of the first embodiment configured as described above is shown in FIG. 8, and an operation thereof will be described with reference to a flowchart of FIG. 9.

Figure 8:
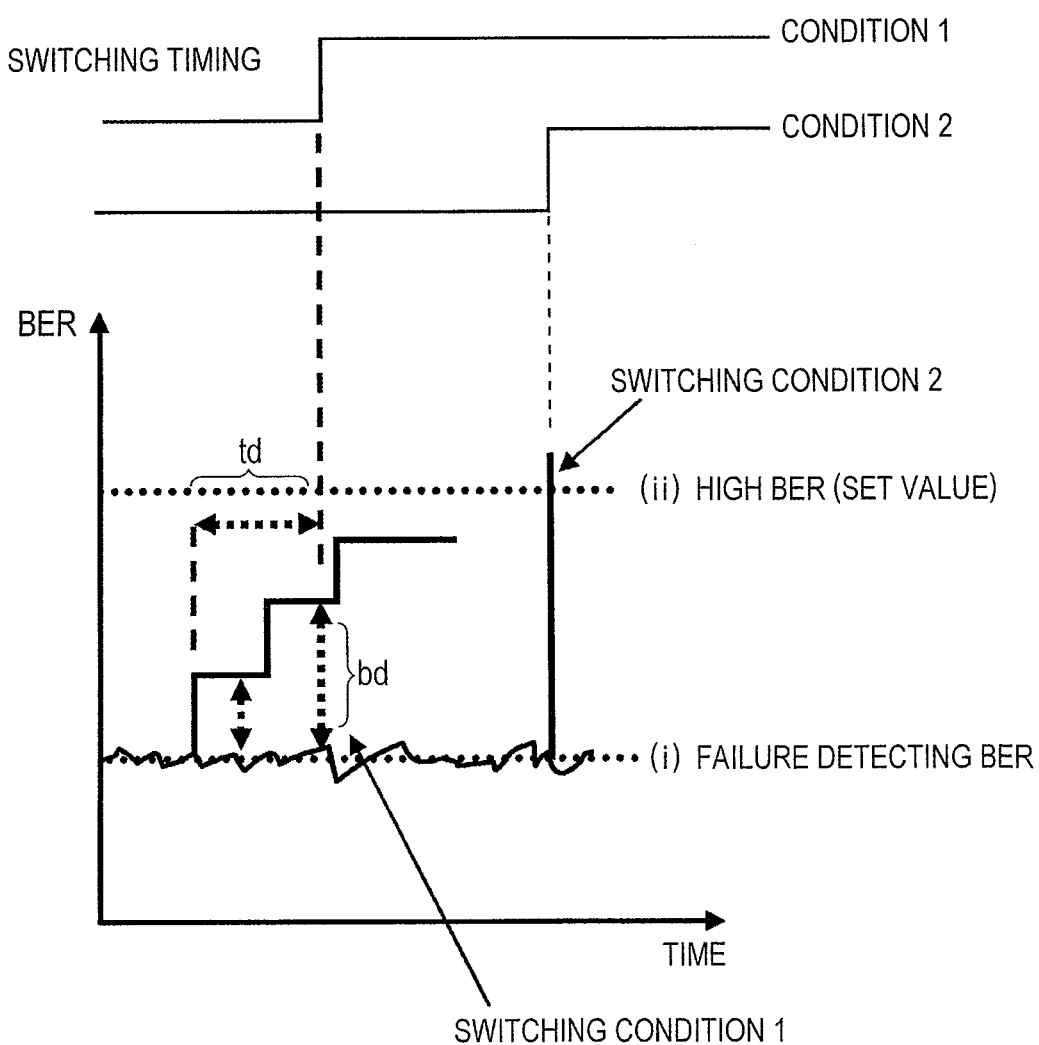
FIG. 8 is an explanatory diagram for showing an example of operations of an error detecting unit included in the data transmission system according to the first embodiment.

FIG. 8 is a waveform diagram for showing an operation example of the error detecting unit 905 of FIG. 6. Further, FIG. 9 is a flowchart for showing operational procedures of the error detecting unit 905 and the like in the failure information analyzing unit 90 of the data transmission system according to the first embodiment.

Figure 9:
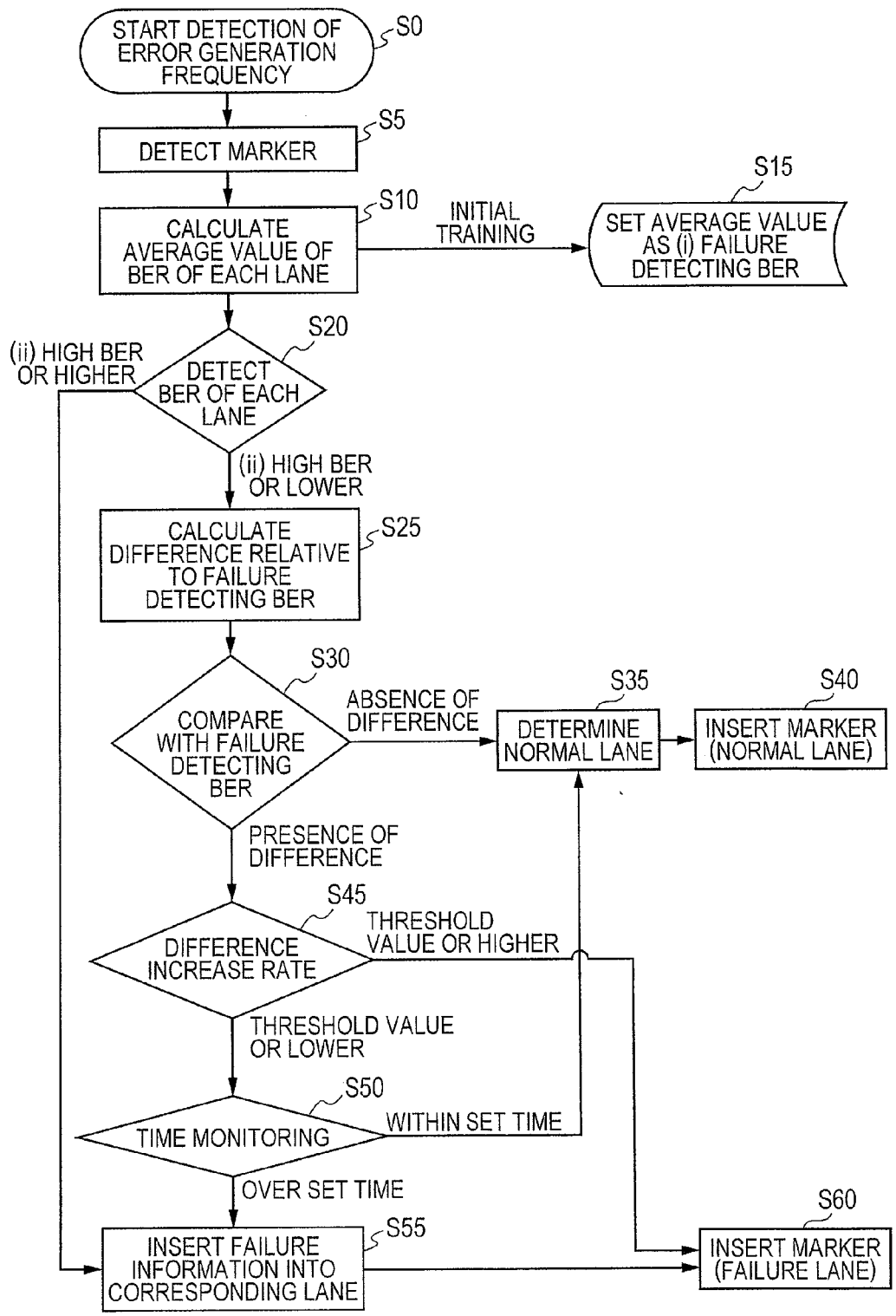
FIG. 9 is a flowchart for showing an example of operational procedures of the error detecting unit included in the data transmission system according to the first embodiment.

A process starts from S0 of the flowchart of FIG. 9. Then, the error detecting unit 905 detects the marker received from the marker analyzing unit 902, detects an error of the bit strings of the data of each lane using the error code included in the marker (S5), and calculates the average value of BERs (Bit Error Rates) in a certain period for each transmission lane (S10). Further, while assuming that a state in which no error occurs in, for example, a CRC (Cyclic Redundancy Check) is set as initial training, the average value of the BERs in a certain period, namely, at each predetermined interval for each lane obtained at the time of initial training is set as a failure detecting BER (i) that is a first reference value (S15).

Further, the value of the BER at the time of initial training in each starting is compared with the set failure detecting BER (i). If the BER at the time of staring is higher, it is determined the lane has been already failure. The set value of the failure detecting BER (i) in the case of one lane and the set value of a high BER (ii) that is a second reference value to determine a failure in the case of one lane are shown in FIG. 8.

The BERs of the all lanes including normal lanes and redundant lanes are always detected (S20). For a lane whose BER is lower than the high BER (ii) that is a preset second reference value, a difference relative to the failure detecting BER (i) that is the first reference value is calculated (S25).

Further, the BERs of the all lanes including normal lanes and redundant lanes are detected (S20). A lane whose BER is higher than the high BER (ii) is determined as a failure lane (S55), the detection signal generating unit 906 is notified of a signal that sets the lane information inserted into the marker as failure, and the failure lane information is inserted into the marker (S60). The determination of a failure lane based on the high BER (ii) corresponds to a switching condition 2 shown in FIG. 8.

A lane having no difference relative to the failure detecting BER (i) that is the first reference value is determined as a normal lane (S35), and the detection signal generating unit 906 is notified of a signal that sets the lane information inserted into the marker as normal. The detection signal generating unit 906 transmits the normal lane information to the transmitter 1 through a dedicated line 31, and the normal lane information is inserted into the marker by the marker generating/inserting unit 302 of the transmitter 1 (S40).

On the other hand, for a lane having a difference relative to the failure detecting BER (i) that is the first reference value, a difference bd of the lane is compared with that of the failure detecting BER (i) at the time of calculation with the previous marker, and the increase rate of the difference is calculated (S45). Then, for a lane whose increase rate of the difference is equal to or lower than a predetermined threshold value, time td in which the difference occurs is monitored (S50). Then, a lane where the time td is within a set time is determined as a normal lane (S35), and the detection signal generating unit 906 is notified of a signal that sets the lane information inserted into the marker as normal. Likewise, the normal lane information is inserted into the marker (S40). On the other hand, a lane whose increase rate of the difference is equal to or higher than the predetermined threshold value is determined as a failure lane or a lane with a sign of a failure (S55), the detection signal generating unit 906 is notified of a signal that sets the lane information inserted into the marker as failure, and the failure lane information is inserted into the marker (S60).

Further, for a lane whose increase rate of the difference obtained by comparing the difference of the lane with that of the failure detecting BER (i) at the time of calculation with the previous marker is equal to or lower than the predetermined threshold value, the time td in which the difference occurs is monitored (S50). A lane where the time td is over the set time is determined as a failure lane or a lane with a sign of a failure, and the detection signal generating unit 906 is notified of a signal that sets the lane information inserted into the marker as failure. Likewise, the failure lane information is inserted into the marker by the marker generating/inserting unit 302 (S60). The determination of a failure lane or a lane with a sign of a failure based on the failure detecting BER (i) corresponds to that based on a switching condition 1 shown in FIG. 8.

Figure 10:
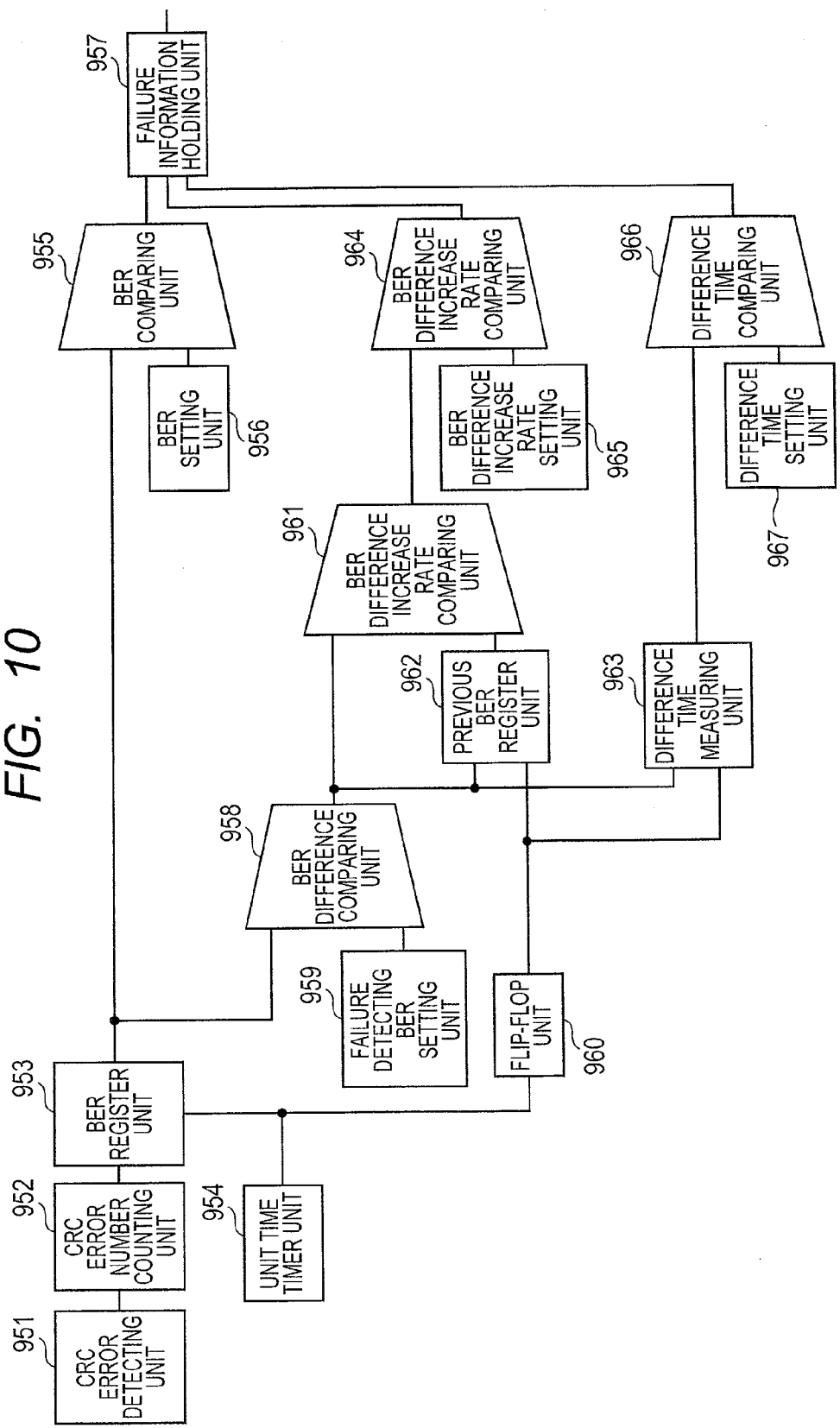
FIG. 10 is a block diagram for showing an example of an internal configuration of the error detecting unit included in the data transmission system according to the first embodiment.

FIG. 10 shows a concrete example of an internal configuration of the error detecting unit 905 according to the embodiment that has been described in detail. In FIG. 10, each block has a function as the name suggests. For example, an error is detected by a CRC check in a data block unit in a CRC error detecting unit 951, and the number of detected errors is counted in a CRC error number counting unit. A BER register unit 953 updates a BER in each unit time or each predetermined interval set by a unit time timer unit 954 that generates predetermined intervals.

The value of the BER register unit 953 is compared with a high BER set by a BER setting unit 956 in a BER comparing unit 955, and the result is output. The high BER corresponds to the high BER (ii) that is the second reference value.

Further, a BER difference comparing unit 958 compares the value of the BER register unit 953 with a failure detecting BER set by a failure detecting BER setting unit 959 to obtain a difference. The failure detecting BER corresponds to the failure detecting BER (i) that is the first reference value. A BER difference increase rate comparing unit 961 is a circuit that compares the difference of the previous BER held by a previous BER register unit 962 with the present difference to obtain the increase rate. Then, a BER difference increase rate comparing unit 964 compares the increase rate with a threshold value of a difference increase rate set by a BER difference increase rate setting unit 965, and outputs the result.

On the other hand, a difference time measuring unit 963 measures time in which a difference is present based on the presence or absence of the difference calculated by the BER difference comparing unit 958. A difference time comparing unit 966 compares the measured time with a set time set by a difference time setting unit 967, and outputs the result.

A block 957 is a failure information holding unit to which the comparison results of the BER comparing unit 955, the BER difference increase rate comparing unit 964, and the difference time comparing unit 966 are input to hold, and thus the detection signal generating unit 906 of FIG. 6 is notified of the failure information of each transmission lane. It should be noted that an output of a flip-flop unit is used to generate a pulse that resets the previous BER register unit 962 and the difference time measuring unit 963 at predetermined intervals based on a unit time from the unit time timer unit 954.

As described above in detail, by using the data transmission method and device of the first embodiment, the BER of each of the all transmission lanes can be always monitored for each transmission lane as a typical example, a failure occurring in a transmission lane can be detected, and a failure can be detected in advance to switch the lane. Further, in a system in which communication speeds are fast and modules and boards are difficult to be replaced, a lane can be switched before a failure of the modules or a failure of the transmission channels occurs.

Further, even in the case where electrical/optical or optical/electrical converting optical modules drastically collapse, a lane can be switched and data can be restored. Thus, a link (connection) can be sustained. Accordingly, the failure rate of the whole system can be reduced, and a highly-reliable system can be established.

Further, for example, even in the case where there are electrical/optical converting modules between receivers in receiver detection training by electric transmission to confirm the presence or absence of an opposed device, a transmission system adapted to the receiver detection training by electric transmission can be established by transmitting and receiving information using the marker of the embodiment.

Second Embodiment

A data transmission system of a second embodiment is different from that of the first embodiment in an error detection method in the error detecting unit included in the receiver. Hereinafter, the data transmission system of the second embodiment will be described while focusing on a difference relative to the first embodiment.

Figure 11:
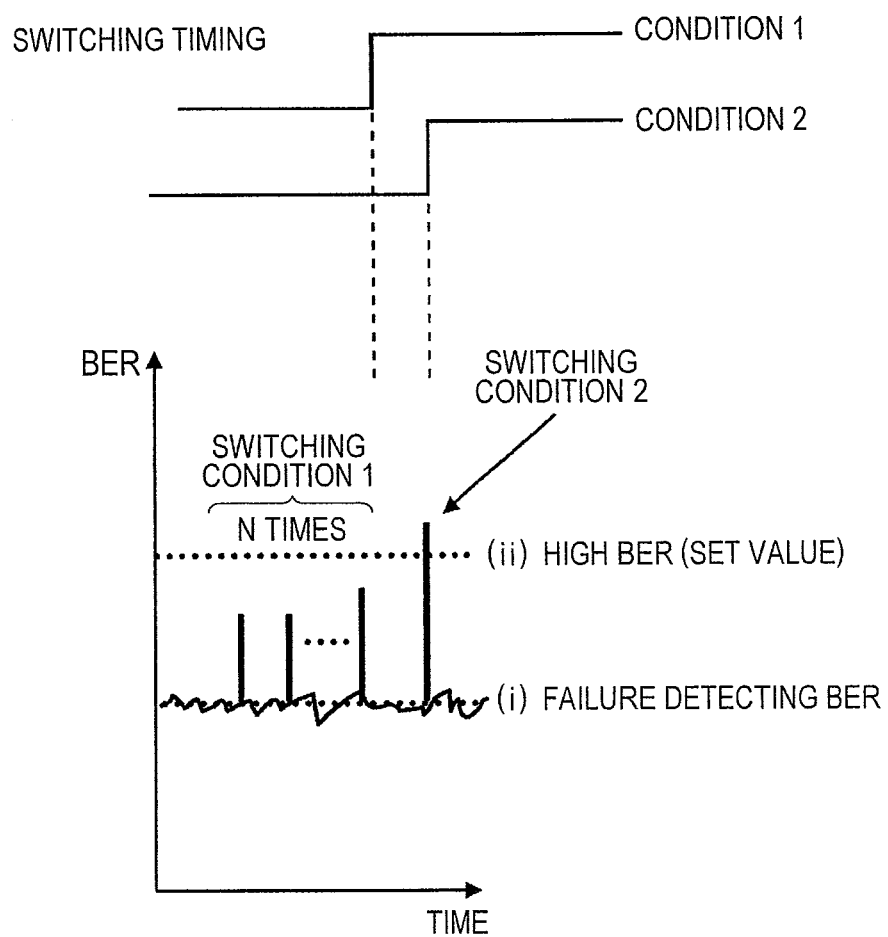
FIG. 11 is an explanatory diagram for showing an operational example of an error detecting unit included in a data transmission system according to a second embodiment.

An operational example of the error detecting unit 905 included in the receiver 2 is shown in FIG. 11, and an operation thereof will be described using a flowchart of FIG. 12.

FIG. 11 is an explanatory diagram for showing an operational example of the error detecting unit 905 in the failure information analyzing unit 90 of the receiver 2 of the data transmission system according to the second embodiment. Further, FIG. 12 is a flowchart for showing operational procedures of the error detecting unit 905 of the data transmission system according to the second embodiment. It should be noted that the error detecting unit 905 that realizes the following operational procedures can be configured as similar to the configuration shown in FIG. 10, and thus the illustration and explanation thereof are omitted.

Figure 12:
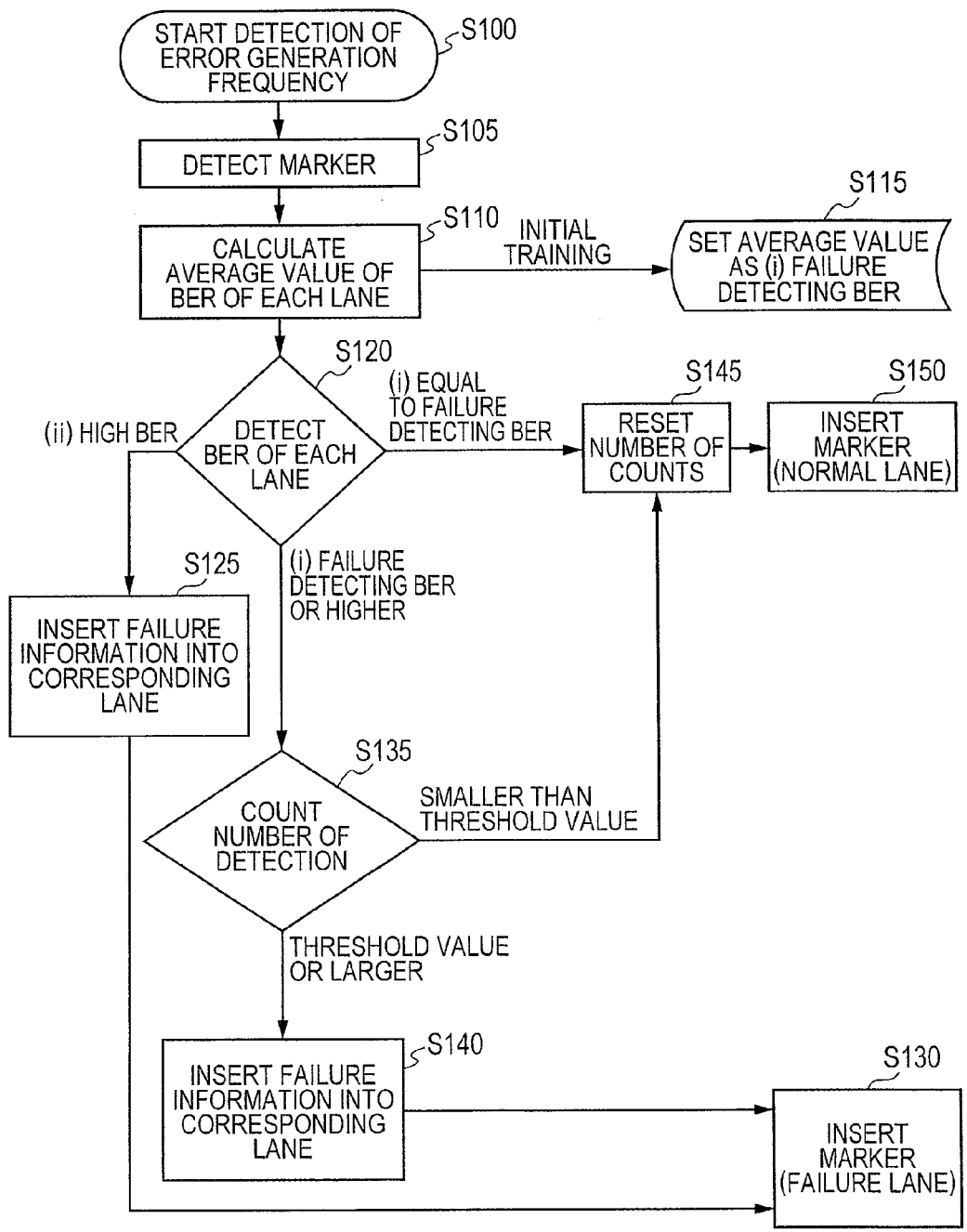
FIG. 12 is a flowchart for showing an example of operational procedures of the error detecting unit included in the data transmission system according to the second embodiment.

A process starts from S100 in FIG. 12. Then, a marker received from the marker analyzing unit 902 is detected, an error of bit strings of data of each lane is detected using an error code included in the marker (S105), and the average value of BERs (Bit Error Rates) in a certain period is calculated for each transmission lane (S110). Further, while assuming that a state in which no error occurs in, for example, a CRC (Cyclic Redundancy Check) is set as initial training, the average value of the BERs in a certain period for each lane obtained at the time of initial training is set as a failure detecting BER (i) (S115). The set value of the failure detecting BER (i) in the case of one lane is shown in FIG. 11.

The BERs of the all lanes including normal lanes and redundant lanes are always detected (S120), a lane whose BER is higher than the set high BER (ii) is determined as a failure lane (S125), the detection signal generating unit 906 is notified of a signal that sets the lane information inserted into the marker as failure, and the failure lane information is inserted into the marker (S130). The set value of the high BER (ii) in the case of one lane and a switching condition 2 based on the set value are shown in FIG. 11.

Further, for a lane whose BER is higher than the failure detecting BER (i) and lower than the preset high BER (ii), the number of times the BERs of the all lanes including normal lanes and redundant lanes exceed the failure detecting BER (i) is counted in a certain period (S135). A lane exceeding a set threshold value is determined as a failure lane or a lane with a sign of a failure (S140), the detection signal generating unit 906 is notified of a signal that sets the lane information inserted into the marker as failure, and the failure lane information is inserted into the marker (S130). This corresponds to the switching condition 1 of FIG. 11.

On the other hand, a lane whose BER is lower than the set high BER (ii) and is equal to or lower than the failure detecting BER (i) is determined as a normal lane, the number of counts is reset (S145), the detection signal generating unit 906 is notified of a signal that sets the lane information inserted into the marker as normal, and the normal lane information is inserted into the marker (S150).

Further, for a lane whose BER is higher than the failure detecting BER (i) and lower than the set high BER (ii), the number of times the BERs of the all lanes including normal lanes and redundant lanes exceed the failure detecting BER (i) is counted in a certain period (S135). A lane lower than a set threshold value is determined as a normal lane, the number of counts is reset (S145), the detection signal generating unit 906 is notified of a signal that sets the lane information inserted into the marker as normal, and the normal lane information is inserted into the marker (S150).

As described above, by using the data transmission method and device of the second embodiment, the BER of each of the all transmission lanes can be always monitored for each transmission lane as a typical example, and a failure occurring in a transmission lane or a sign of a failure can be detected in advance to switch the lane. Thus, the reliability of the whole data transmission system can be improved.

Third Embodiment

A data transmission system according to a third embodiment is different from that according to the first or second embodiment in that functions of transmitting the marker exemplified in FIG. 7 to a transmission lane and of changing a cycle to be inserted to a data string composed of transmitted data and an error code are added to the marker generating/inserting unit 302 included in the transmitter 1. Hereinafter, the data transmission system of the third embodiment will be described while focusing on a difference relative to the first or second embodiment.

Figure 13:
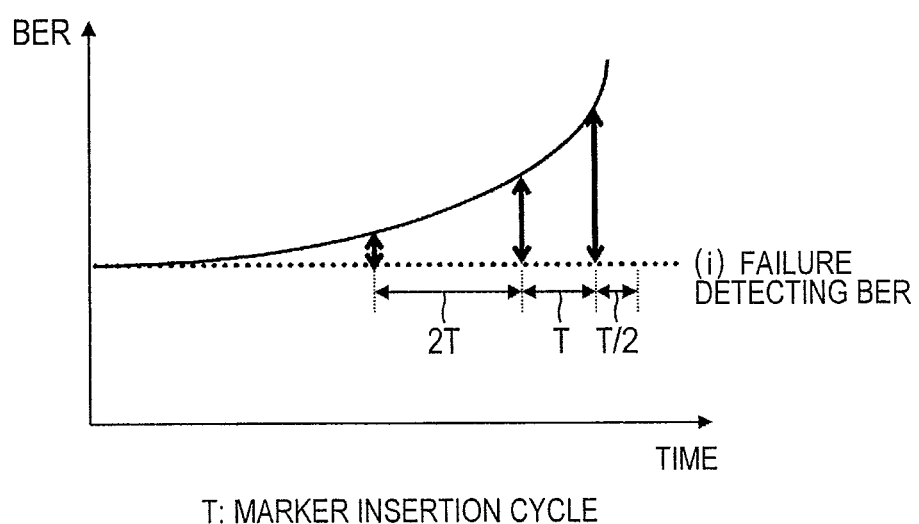
FIG. 13 is an explanatory diagram for showing an example of operations of a marker generating/inserting unit included in a data transmission system according to a third embodiment.
Figure 14:
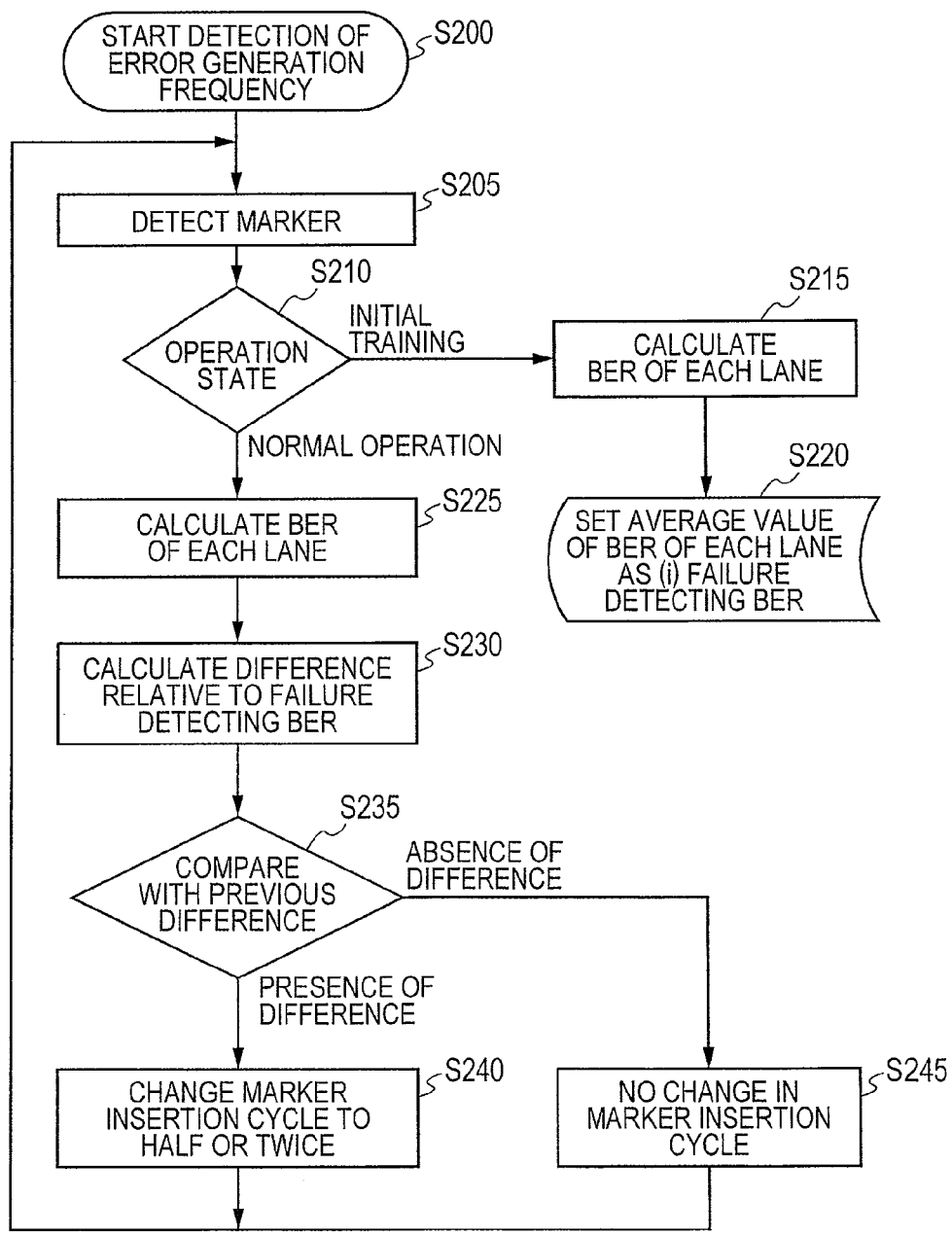
FIG. 14 is a flowchart for showing operational procedures of an error detecting unit and the marker generating/inserting unit included in the data transmission system according to the third embodiment.

Operational examples of the error detecting unit 905 and the marker generating/inserting unit 302 included in the third embodiment are shown in FIG. 13, and an operation thereof will be described with reference to a flowchart of FIG. 14. It should be noted that the error detecting unit 905 that realizes the following operational procedures can be configured as similar to the configuration shown in FIG. 10, and thus the illustration and explanation thereof are omitted.

FIG. 13 is an explanatory diagram for showing an operational example of the marker generating/inserting unit 302 included in the data transmission system according to the third embodiment. Further, FIG. 14 is a flowchart for showing operational procedures of the error detecting unit 905 and the detection signal generating unit 906 in the failure information analyzing unit 90 of FIG. 6 and the marker generating/inserting unit 302 in the lane number switching controlling unit 30 of FIG. 5 in the data transmission system according to the third embodiment.

A process starts from S200. Then, the error detecting unit 905 detects an error of bit strings of data of each lane using an error code included in a marker received from the marker analyzing unit 902 (S205), and the state of the transmission lane is monitored (S210).

Then, the error detecting unit 905 calculates the average value of BERs (Bit Error Rates) in a certain period for each transmission lane (S215). Further, while assuming that a state in which no error occurs in, for example, a CRC (Cyclic Redundancy Check) is set as initial training, the average value of the BERs in a certain period for each lane obtained at the time of initial training is set as a failure detecting BER (i) (S220). This corresponds to the failure detecting BER (i) shown in FIG. 13.

On the other hand, in the case of a normal state, the BERs of the all lanes including normal lanes and redundant lanes are always detected (S225), and a difference relative to the failure detecting BER (i) is calculated (S230). For a lane having a difference relative to the failure detecting BER (i), the difference of the lane is compared with that of the failure detecting BER at the time of calculation with the previous marker to calculate an increase or decrease of the difference (S235). For a lane having a difference relative to the failure detecting BER, in the case where the difference is increased as shown in FIG. 13, the cycle of inserting the markers into the bit strings of the data is halved to T/2. In the case where the difference is decreased, the detection signal generating unit 906 is notified of an instruction signal to double the cycle of inserting the markers into the bit strings of the data to 2T.

The lane number switching controlling unit 30 inputs a signal received from the detection signal generating unit 906 to the marker generating/inserting unit 302 through the lane information analyzing unit 303, and the marker generating/inserting unit 302 inserts the markers in the instructed cycle (S245). It should be noted that the magnification of the cycle to be changed is not particularly limited.

On the other hand, for a lane having no difference relative to the failure detecting BER, the error detecting unit 905 notifies the detection signal generating unit 906 of a signal that sets the cycle of inserting the markers into the bit strings of the data at the same cycle as the last time. The lane number switching controlling unit 30 inputs the signal received from the detection signal generating unit 906 into the marker generating/inserting unit 302 through the lane information analyzing unit 303, and the marker generating/inserting unit 302 inserts the markers in the same cycle as the last time (S245).

According to the embodiment, a detection time can be adjusted in accordance with the failure state of modules by providing the function of changing the insertion intervals of the markers inserted into the data strings.

By using the above-described data transmission method and device of the present invention, the BER of each of the all transmission lanes can be always monitored for each transmission lane, a failure can be dynamically detected in a rapid increase of the BER caused by a failure occurring in a transmission lane, and a transmission lane for which a sign of a failure is detected in advance can be switched. Thus, the reliability of the whole data transmission system can be improved.

According to the present invention, the failure rate of the whole system can be reduced, and a highly-reliable system can be established. Further, in a system in which communication speeds are fast and modules and boards are difficult to be replaced, a lane can be switched before a failure of the modules or a failure of the transmission channels occurs.

The present invention has been concretely described above on the basis of the various embodiments. However, the present invention is not limited to the embodiments, but can be variously changed without departing from the scope of the present invention. Further, a part of a configuration in one embodiment can be replaced by that of another embodiment, and a configuration in one embodiment can be added to that of another embodiment. In addition, a part of a configuration in the embodiments can be added to or replaced by another, or deleted.

Further, there has been mainly described an example in which some or all of the configuration, function, processing units, processing means, and the like of the failure information analyzing unit 90 are realized by hardware such as circuit design. However, the configuration, function, and procedures can be realized by software executing programs realizing the functions and procedures. In this case, information of programs, tables and files for realizing the functions can be stored in not only a memory, but also a recording device such as a hard disk or an SSD (Solid State Drive), or a recording medium such as an IC card, an SD card, or a DVD. Further, the information can be downloaded or installed through a network or the like if needed.

What is claimed is:

1. A data transmission system comprising:
  a transmitter and a receiver in which communications are performed therebetween using "n" transmission lanes connecting the transmitter and receiver, where n is an integer greater than or equal to 2,
  wherein the transmitter includes:
  an error code generating unit that generates an error code for "x" data strings input to the error code generating unit, where x is an integer less than n; and
  a lane switching controlling unit that distributes the data strings and the error code to the transmission lanes,
  wherein the lane switching controlling unit:
  determines which of the n transmission lanes to which the data strings and the error code are distributed based on information received from the receiver,
  generates detection information to detect a failure in each of the n transmission lanes,
  generates a marker including the detection information and the lane information; and
  inserts the marker into each of data strings to be transmitted to the receiver on the n transmission lanes, and
  wherein the receiver includes:
  a detecting unit that detects the marker from the data strings transmitted on the n transmission lanes;
  an error correcting in the data strings transmitted on the n transmission lanes using the error code; and
  a failure information analyzing unit that determines which of the transmission lanes are to be used among the n transmission lanes based on the lane information in the marker, and detects a failure in one of the transmission lanes based on the detection information in the marker,
  wherein the failure information analyzing unit calculates an increase in a respective error generation rate based on the marker so as to detect a sign of failure for each of the transmission lanes.

2. The data transmission system according to claim 1,
  wherein the failure information analyzing unit of the receiver includes an error detecting unit that derives the respective error generation rate, in each of the transmission lanes, of the data strings transmitted on the some or all of the transmission lanes based on the detection information in the marker detected by the detecting unit, and detects the failure in each one of the transmission lanes using the respective error generation rate.

3. The data transmission system according to claim 2,
  wherein the error detecting unit derives, in a certain period, a first reference value for detecting a failure of each transmission lane in advance for the data strings transmitted on the some or all of the transmission lanes, and detects the failure in each one of the transmission lanes in advance using the first reference value and the respective error generation rate.

4. The data transmission system according to claim 3,
  wherein the error detecting unit calculates a difference between the first reference value and the respective error generation rate at each of a plurality of predetermined intervals, compares the differences calculated at the predetermined intervals with each other to calculate an increase or decrease in the differences, and detects the failure or a normal status in each one of the transmission lanes based on a degree of the increase or decrease.

5. The data transmission system according to claim 3,
  wherein the error detecting unit calculates a difference between the first reference value and the respective error generation rate at each of a predetermined intervals, and detects the failure or the normal status in each one of the transmission lanes based on a time in which the difference is detected.

6. The data transmission system according to claim 3,
  wherein the error detecting unit calculates a difference between the first reference value and the respective error generation rate at each of a predetermined intervals, and detects the failure or the normal status in each one of the transmission lanes based on the number of times of detecting the difference occurs.

7. The data transmission system according to claim 1,
  wherein the lane switching controlling unit changes a cycle of inserting the marker into each of the data strings transmitted on the n transmission lanes.

8. A data reception device connected to a transmitter by n transmission lanes, where n is an integer greater than or equal to 2, the data reception device comprising:
  a detecting unit that detects a marker including lane information and detection information to detect a failure in each of the n transmission lanes from data strings including transmitted data and an error code received on the n transmission lanes;
  an error correcting unit that corrects an error in the data strings transmitted on the n transmission lanes using the error code; and
  a failure information analyzing unit that determines a transmission lane to be used among the n transmission lanes based on the lane information in the marker, and detects a failure in one of the n transmission lanes based on the detection information in the marker,
  wherein the failure information analyzing unit calculates an increase in a respective error generation rate based on the marker so as to detect a sign of failure for each of the transmission lanes, and
  the failure information analyzing unit notifies the transmitter of the lane information including whether the failure or the sign of failure has been detected in one of the transmission lanes.

9. The data transmission reception device according to claim 8,
  wherein the failure information analyzing unit includes an error detecting unit that derives the respective error generation rate, in each of the transmission lanes, of the data strings transmitted on some or all of the transmission lanes based on the detection information in the marker in each certain period, and detects the failure in each of the transmission lanes using the respective error generation rate.

10. The data reception device according to claim 9,
  wherein the error detecting unit derives, in a certain period, a first reference value for detecting a failure of each transmission lane in advance for the data strings transmitted on the some or all of the transmission lanes, and detects the failure in each one of the transmission lanes in advance using the first reference value and the respective error generation rate.

11. The data reception transmission device according to claim 10,
  wherein the error detecting unit calculates a difference between the first reference value and the respective error generation rate at each of a plurality of predetermined intervals, compares the differences calculated at the predetermined intervals with each other to calculate an increase or decrease in the differences, and detects the failure or a normal status in each one of the transmission lanes based on a degree of the increase or decrease.

12. The data reception device according to claim 10, wherein the error detecting unit calculates a difference between the first reference value and the respective error generation rate at each of a plurality of predetermined intervals, and detects the failure or a normal status in each one of the transmission lanes based on a time in which the difference is detected.

13. The data reception device according to claim 10, wherein the error detecting unit calculates a difference between the first reference value and the respective error generation rate at each of a plurality of predetermined intervals, and detects the failure or a normal status in each one of the transmission lanes based on a number of times the difference occurs.

* * * * *